US 9,982,836 B2

(12) United States Patent
Wallace (10) Patent No.: US 9,982,836 B2
(45) Date of Patent: May 29, 2018

(54) USER TERMINAL CLAMP

(71) Applicant: WorldVu Satellites Limited, St Helier, Jersey, Channel Islands (GB)

(72) Inventor: John Wallace, Los Gatos, CA (US)

(73) Assignee: WorldVu Satellites Limited, Arlington, VA (US)

( * ) Notice: Subject to any disclaimer, the term of this patent is extended or adjusted under 35 U.S.C. 154(b) by 0 days. days.

(21) Appl. No.: 15/457,707

(22) Filed: Mar. 13, 2017

(65) Prior Publication Data

US 2017/0268719 A1 Sep. 21, 2017

Related U.S. Application Data

(60) Provisional application No. 62/310,922, filed on Mar. 21, 2016.

(51) Int. Cl.
*F16M 13/02* (2006.01)
*H01Q 1/12* (2006.01)
*H01Q 1/20* (2006.01)
*F16B 2/10* (2006.01)
*F16B 2/18* (2006.01)

(52) U.S. Cl.
CPC ............ *F16M 13/022* (2013.01); *F16B 2/10* (2013.01); *F16B 2/185* (2013.01); *H01Q 1/1207* (2013.01); *H01Q 1/1221* (2013.01); *H01Q 1/1228* (2013.01); *H01Q 1/20* (2013.01)

(58) Field of Classification Search
CPC .. F16M 13/022; H01Q 1/1228; H01Q 1/1207; H01Q 1/20; H01Q 1/1221; F16B 2/10; F16B 2/185
USPC ........... 248/637, 645, 673, 680, 681, 231.51
See application file for complete search history.

(56) References Cited

U.S. PATENT DOCUMENTS

| | | | | |
|---|---|---|---|---|
| 7,219,866 | B2* | 5/2007 | Depay | F16B 2/12 248/229.22 |
| 9,554,669 | B1* | 1/2017 | Hughes | A47J 37/0731 |
| 2002/0003504 | A1* | 1/2002 | Yoshida | H01Q 1/1207 343/892 |
| 2002/0162924 | A1* | 11/2002 | Herzog | H01Q 1/1221 248/218.4 |
| 2004/0135047 | A1* | 7/2004 | Hunt | F16M 13/02 248/229.14 |
| 2007/0012834 | A1* | 1/2007 | Elliott | F16B 2/185 248/226.11 |
| 2008/0291114 | A1* | 11/2008 | Haight | H01Q 1/1207 343/882 |

(Continued)

FOREIGN PATENT DOCUMENTS

DE 29518105 U1 1/1996

OTHER PUBLICATIONS

Officer Joannes Vergoosen, "International Search Report and the Written Opinion", International Patent Application No. PCT/US2017/023379, Completed Jun. 20, 2017, 13 pp.

*Primary Examiner* — Muhammad Ijaz
(74) *Attorney, Agent, or Firm* — Kaplan Breyer Schwarz, LLP (57) ABSTRACT

A user-terminal clamp that receives a user terminal of a satellite communications system, wherein the clamp clamps to a roof of a structure in either of two orthogonal orientations. The clamp includes a frame having a pair of movable clamping members that are actuated by a handle. The frame includes slots or channels that receive ribs that are disposed on the underside of the user terminal.

14 Claims, 7 Drawing Sheets

(56) References Cited

U.S. PATENT DOCUMENTS

| | | | |
|---|---|---|---|
| 2010/0025559 A1* | 2/2010 | Rathbone | H01Q 1/1228 248/534 |
| 2012/0098731 A1* | 4/2012 | Ludwick | H01Q 1/08 343/881 |
| 2014/0227021 A1 | 8/2014 | Kamen et al. | |
| 2016/0312943 A1* | 10/2016 | Yang | F16M 11/18 |
| 2017/0268719 A1* | 9/2017 | Wallace | F16B 2/10 |

* cited by examiner

FIG. 5B

USER TERMINAL CLAMP

STATEMENT OF RELATED CASES

This case claims priority of U.S. patent application Ser. No. 62/310,922 filed Mar. 21, 2016 and incorporated by reference herein.

FIELD OF THE INVENTION

The present disclosure relates to user terminals for satellite communications systems.

BACKGROUND

Satellite systems for bringing low-cost broadband internet service to any location on the earth are currently being developed. Such systems typically include gateway antennas that link the internet to a fleet of non-geostationary satellites, which in turn link to inexpensive user terminals positioned on the earth. The user terminals deliver internet connectivity to residences and businesses.

The inexpensive user terminal mentioned above includes an antenna that requires an unobstructed view over a large section of the sky in all azimuthal directions (north, south, east, and west directions) in order to receive uninterrupted service from the satellites.

Individual users with a minimum of expertise are likely to be mounting and installing the user terminal on the roof of their residences or businesses. Accordingly, an inexpensive and easy-to-use device is needed for enabling a user to securely couple the user terminal to a roof.

SUMMARY

The present invention provides a clamping device that, without the use of tools, clamps to structure, such as a wall or roof of a building, etc., in either of two orthogonal orientations and receives a user terminal, as mentioned above.

A user-terminal clamp in accordance with the illustrative embodiment includes a frame having a pair of movable clamping members that are actuated by a handle. By virtue of the structure of the frame, the mounted user terminal has the same orientation (e.g., with respect to the ground) regardless of the clamping orientation. The frame includes a coupler to couple the user terminal to the user-terminal clamp. In the illustrative embodiment, the coupler comprises slots or channels that receive ribs that are disposed on the underside of the user terminal.

The handle is operatively coupled to an internally disposed actuation mechanism, which includes a cable, a cable ramp, a pulley, and a cable tensioner. The actuation mechanism couples to the clamping members. Rotation of the handle thus causes the clamping members to move; in particular, to a clamping position.

The cable ramp, by virtue of its shape, imparts a variable rotary motion. The cable is attached to one end of the cable ramp; the other end of the cable is coupled to one or more cable tensioners. In the illustrative embodiment, the cable tensioners are anchored within at least one of the clamping members. The cable ramp is operatively coupled to the handle, so that when the handle is rotated, the cable ramp rotates as well.

When the user-terminal clamp is in a fully open, untensioned state, the cable ramp is in a first position that effectively creates a relatively shorter path for the cable between its two points of attachment. Partial rotation of the handle moves the cable ramp towards a second position that effectively lengthens the path for the cable between its two points of attachment. The lengthening of the path, for the (fixed length) cable creates a tension that draws the clamping members upward to a clamping position.

The user-terminal clamp includes two features that impart adjustability in terms of the thickness of the structure to which the clamp attaches. Varying thickness is accommodated, primarily, via the cable tensioner(s). When clamping to a relatively thicker member, less travel of the clamping members is required. In such a situation, the clamping members engage the structure when the handle and cable ramp have only moved through a portion of the total available rotation. As the handle (and cable ramp) are rotated to their final position, the cable tensioner(s) stretch (tension) or compact (compression) depending on their design, to accommodate the remaining rotation of the handle. The tension imparted to the cable provides a clamping force. Because of this particular arrangement, the clamp provides a greater clamping force when clamping to a relatively thicker structure than a relatively thinner one.

The second feature that imparts adjustability is foam pads that are disposed on the clamp heads of the clamping members. In some embodiments, the clamp is formed from metal. A plastic housing overlies the metal structure.

DETAILED DESCRIPTION

Figure 1A:
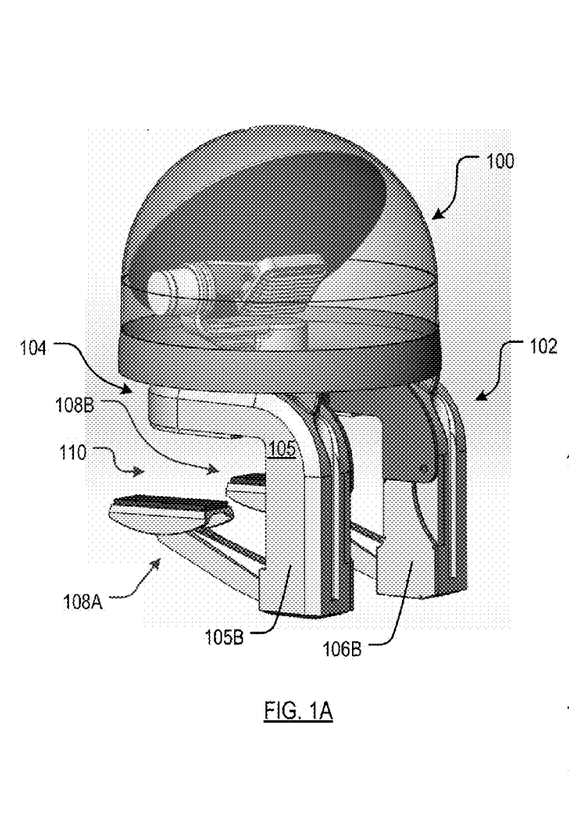
FIGS. 1A-1B depict perspective views of the user-terminal clamp coupled to a user terminal. The two figures depict the user-terminal clamp being used in two different orientations.
Figure 1B:
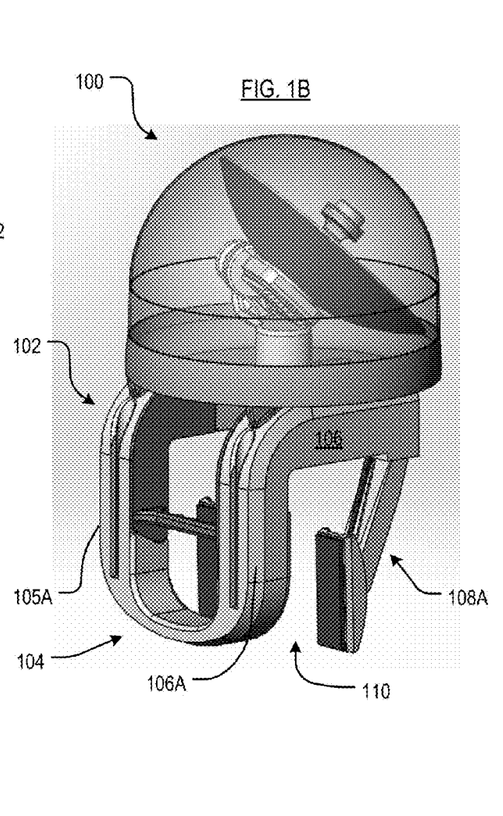

FIGS. 1A and 1B depict user-terminal clamp 102 coupled to a user-terminal 100 for clamping the user terminal to the structure (not depicted). User terminal 102 includes antenna 560 and supporting electronics 560 enclosed by radome 560 (see FIG. 5B).

FIG. 1A depicts user-terminal clamp 102 in a horizontal orientation, such as for mounting to a roof eave. FIG. 1B depicts user-terminal clamp 102 in a vertical orientation, such as for mounting to a parapet.

As depicted in FIGS. 1A and 1B, user-terminal clamp 102 includes frame 104 comprising two support members 105 and 106 that are in parallel, spaced-apart relation to one another. Each support member comprises two segments that are disposed orthogonally to one another. In particular, support member 105 includes horizontal support segment 105A and vertical support segment 105B. Likewise, support member 106 includes horizontal support segment 106A and vertical support segment 106B.

Paired horizontal supports segments 105A and 106A couple to and support user terminal 100 when user-terminal clamp 102 is being used in a horizontal position, as in FIG. 1A. Paired vertical supports segments 105B and 106B couple to and support user terminal 100 when user-terminal clamp 102 is being used in a vertical position, as in FIG. 1B.

User-terminal clamp 102 further includes clamping members 108A and 108B. Clamping region 110 is defined between a portion of the clamping members and horizontal supports segments 105A and 106A. In use, the portion of the structure (e.g., eaves, parapet, etc.) to which user-terminal clamp 102 is to be clamped is positioned in clamping region 110 and the clamp is then tightened to the structure.

Figure 2A:
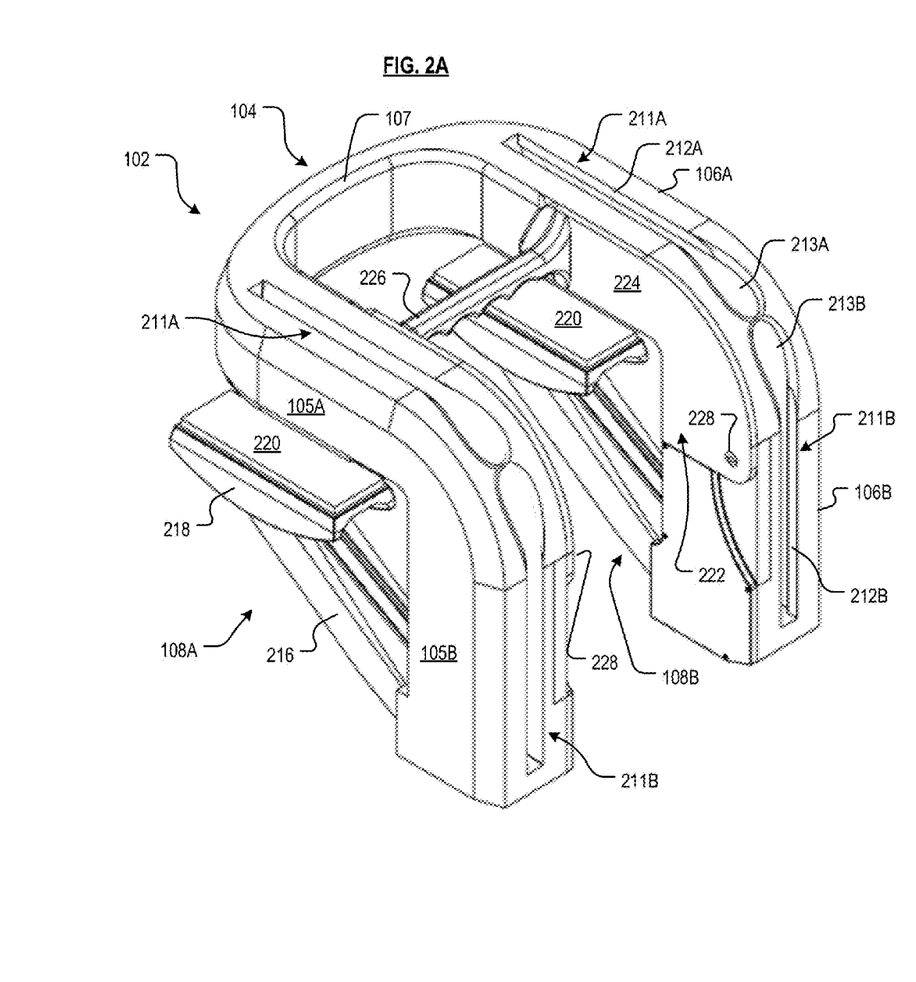
FIG. 2A depicts a first perspective view of an embodiment of a user-terminal clamp in accordance with the present invention.
Figure 2B:
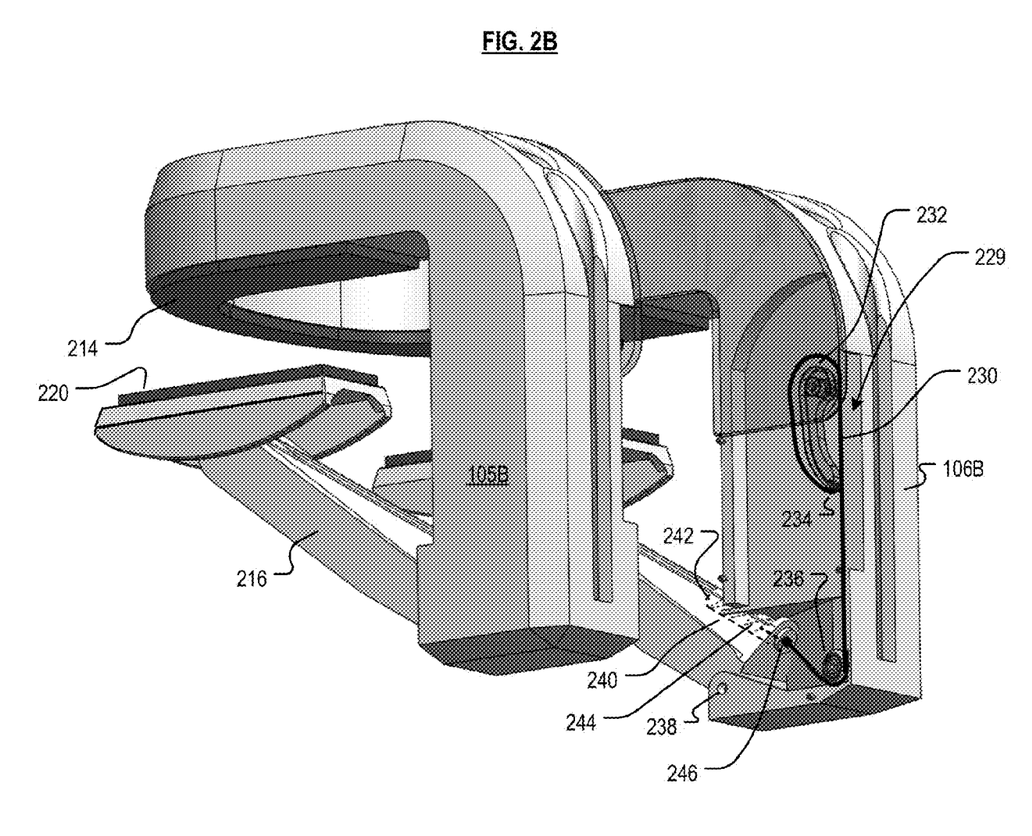
FIG. 2B depicts a second perspective view of the user terminal-clamp of FIG. 2A, showing the internal actuation mechanism.

FIGS. 2A and 2B depict, via perspective views, further detail of user-terminal clamp 102. As depicted in these figures, frame 104 of the user-terminal clamp is u-shaped, wherein portion 107 bridges the separation between spaced support members 105 and 106. In some embodiments, portion 107 is attached to support members 105 and 106 (e.g., welded, soldered, glued, bolted, etc.). In the illustrative embodiment, frame 104 is formed as a unitary, monolithic structure. For use in this disclosure and the appended claims, portion 107 is referred to as a "bridging portion" of the frame, which designation applies to embodiments in which the frame is assembled from individual members as well as embodiments in which the frame is formed as a unitary, monolithic structure.

Horizontal support segments 105A and 106A each include channel or slot 211A. The slot receives ribs, bosses, or other type of projections (hereinafter simply "ribs") disposed on the bottom of user terminal 100 (see, e.g., FIGS. 5A and 5B), thereby enabling user-terminal clamp 102 and user terminal 100 to couple to one another.

Each slot 211A includes widened entry region 213A, which facilitates insertion of the ribs of the user terminal into the slots. Slot 211A includes a locking feature for immobilizing a rib of the user terminal in the slot. In the illustrative embodiment, the locking feature is lip 212A, which runs along the length of the outer edge of the slot. To couple a user terminal to user-terminal clamp 102, the (two) ribs disposed on the base of the user terminal are slid into the two slots 211A. With each slot, the rib is inserted such that a coupling feature of the rib (e.g., protrusions extending from the outer edge the rib, an upper edge of the outer edge of the rib, etc.) is disposed below the underside of lip 212A. This immobilizes the rib and, hence, the user terminal. To disengage the user terminal from the user-terminal clamp, the rib/user terminal is slid out of slot 211A. Each slot 211B functions in the same manner as slots 211A to couple a user terminal to the user-terminal clamp for a vertical clamping application. In some other embodiments, the locking feature could include two lips, one on each side of the slot, or a lip on the inside edge of the slot, or the lips could be on the right edge of each slot or the left edge of each slot.

Another salient feature of user-terminal clamp 102 are clamping members 108A and 108B. The clamping members are rotatably coupled to the vertical support segments 105B and 106B near the base thereof at pivot point 238 (not visible in FIG. 2A; see FIG. 2B, the pivot point attachment at vertical support segment 105B is obscured.)

Each clamping member includes arm 216 and clamp head 218. In the illustrative embodiment, clamp head 218 is rigidly fixed to arm 216. In some other embodiments, clamp head 218 is rotatably coupled to arm 216.

Resilient pads 220 are disposed on the upper surface of each clamp head 218. Resilient pad(s) 214 (see FIG. 2B) are disposed on frame 104 at the surface thereof that opposes clamp heads 218. In the illustrative embodiment, the resilient pads comprise medium density foam.

Clamping members 108A and 108B are actuated to clamp via handle 222. The handle comprise two plates 224 (one plate on a portion of the inside surface of each support member 105 and 106) and grip 226. Handle 222 is rotatably coupled to frame 104 at pins 228.

Actuation mechanism 229 by which handle 222 actuates clamping members 108A/108B is depicted in FIG. 2B. In the illustrative embodiment, there are two instances of actuation mechanism 229; one in each of vertical support segments 105B and 106B (although only the mechanism in segment 106B is depicted). However, in some alternative embodiments, the user-terminal clamp includes only one actuation mechanism 229 situated, for example, in one of the vertical support segments.

Actuation mechanism 229 includes cable 230, cable ramp 232, pulley 236, and cable tensioner 244. As depicted in FIG. 2B, one end of cable 230 is attached to cable ramp 232 at attachment point 234. The cable runs downward through vertical support segment 106B, engages pulley 236 near the bottom thereof, and enters the base of arm 216 through opening 246.

Cable tensioner 244 is disposed in internal chamber 240. In the illustrative embodiment, cable tensioner 244 is a spring. One end of the spring is fixed to distal end 242 of chamber 240. The second end of cable 230 is attached to the end of the spring nearest opening 246. In the illustrative embodiment, cable tensioner 244 is arranged so that it is placed in tension when it is tensioning cable 230. Without limitation, in such embodiments, cable tensioner 244 can be implemented as one or more springs, such as conventional spiral or helical springs, elastic and resilient members, a pneumatic spring, etc. In some other embodiments, the cable tensioner is arranged so that it is placed in compression to effect cable tensioning. In such an embodiment, cable 230 would typically be coupled to cable tensioner 244 at the distal end thereof (i.e., the end furthest from opening 246). Without limitation, in such embodiments, cable tensioner 244 can be implemented as a compression spring, a Belleville washer, resilient washers, or other resilient members. In some further embodiments, cable tensioner 244 is a motor.

The operation of actuation mechanism 229 is best understood with reference to FIGS. 3A through 3D and 4A through 4D.

Figure 3A:
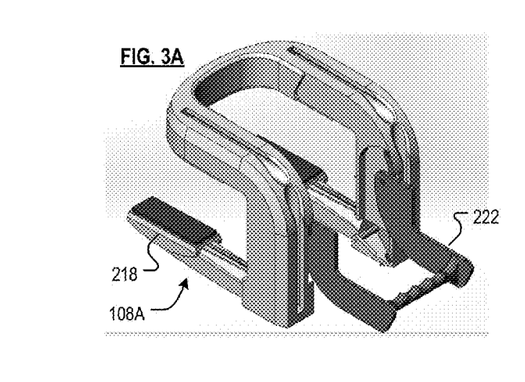
FIGS. 3A-3C depict the handle of the user-terminal clamp being partially rotated ending with the clamp making contact with a structure being clamped (not depicted).
Figure 3B:
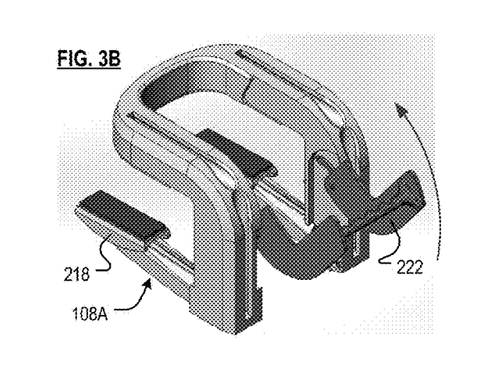
Figure 3C:
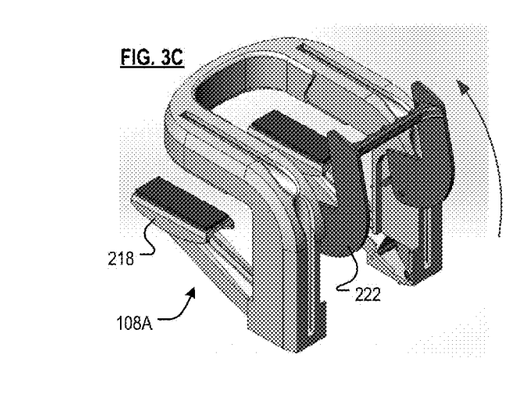
Figure 3D:
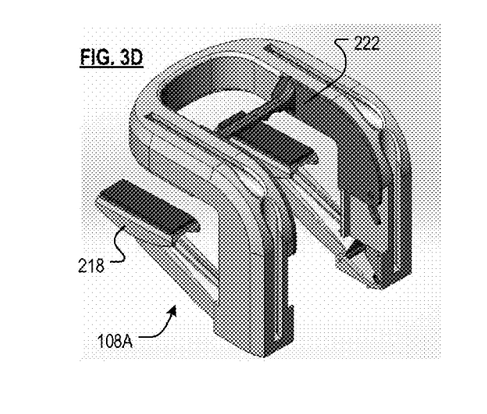
FIG. 3D depicts the action of the cable tensioner to enable full handle rotation and clamping.

FIGS. 3A through 3D depict movement (partial rotation) of handle 222 to actuate user-terminal clamp 102. FIG. 3A depicts user-terminal clamp 102 in a fully opened and un-tensioned state. FIG. 3B depicts handle 222 being partially rotated upward to cause clamp heads 218 of clamping members 108A and 108B to move upward. The rotation of handle 222 is continued in FIG. 3C. At this point, it is assumed that the clamp heads have engaged the structure (not depicted) being clamped and tensioning device 244 is applying tension to cable. In FIG. 3D, handle 222 is fully rotated. The movement of handle 222 past the point at which clamp heads 218 engaged the structure (FIG. 3C) creates a tension in cable 230 that provides a clamping force.

FIGS. 4A through 4D depict various states of actuation mechanism 229, which correspond to the clamping sequence depicted in respective FIGS. 3A through 3D. Each of FIGS. 4A through 4D depict cable 230, cable ramp 232, pulley 236, cable tensioner 244, and internal chamber 240.

Figures 4A, 4C:
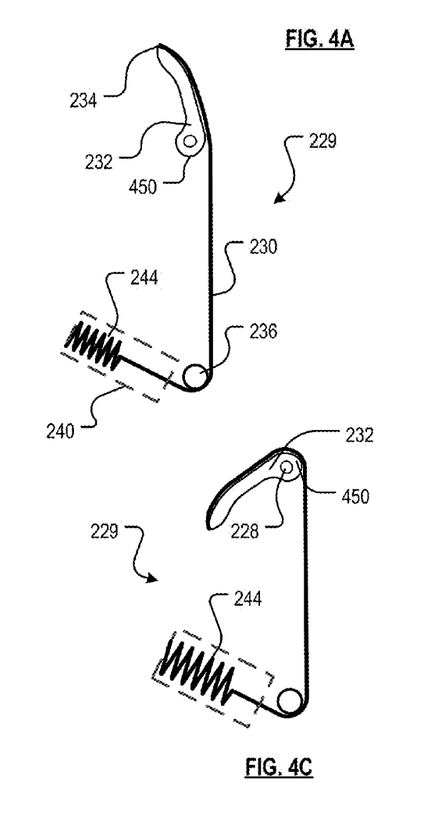
FIGS. 4A-4D depict the cable system and the positions of the cable ramp corresponding to the states (i.e., positions of the handle of the user-terminal clamp) depicted in FIGS. 3A-3D.

FIG. 4A depicts the state of actuation mechanism 229 that corresponds to the position of handle 222 shown in FIG. 3A. This represents user-terminal clamp 102 in a fully open state. As depicted in FIG. 4A, cable ramp 232 points "up." In this orientation, there is minimal tension on cable 230 because the path from one end of the cable at attachment point 234 to the other end of the cable is the shortest possible path.

Figure 4B:
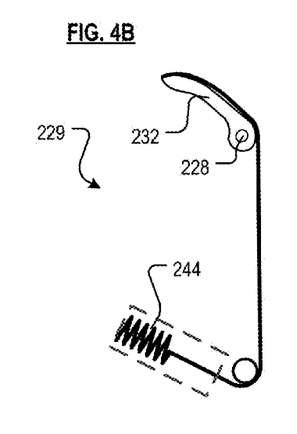

In FIG. 4B, cable ramp 232 begins to rotate "downward" in concert with the upward rotation of handle 222. Note that handle 222 and cable ramp 232 are coupled via pin 228.

In FIG. 4C, the rotation of cable ramp 232 continues as handle 222 is rotated further upward. It is notable that as cable ramp 232 rotates "downward" about pin 228 in concert with the upward rotation of handle 222, cable 230 traverses increasingly more of curved lobe 450 of the cable ramp. Initially, this causes clamp heads 218 to rise (e.g., FIGS. 3B, 3C). However, once contact is made with a structure to be clamped, further rotation of handle 222 and cable ramp 232 tensions the cable, increasing the clamping pressure on structure being clamped.

Figure 4D:
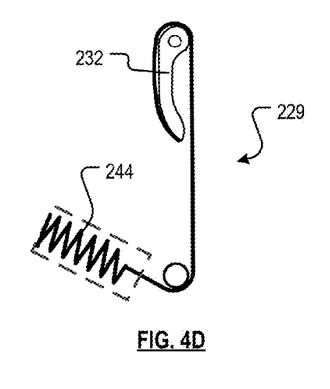

FIG. 4D depicts actuation mechanism in a fully tensioned state, wherein cable 230 engages the maximum amount of curved lobe 450 of cable ramp 232. In this state, cable 230 is under maximum tension. Since clamp heads 218 substantially stop moving "upward" after contacting the clamped structure (FIG. 3C/4C), the additional tension in the system is applied as clamping force to the clamped structure.

Figure 5A:
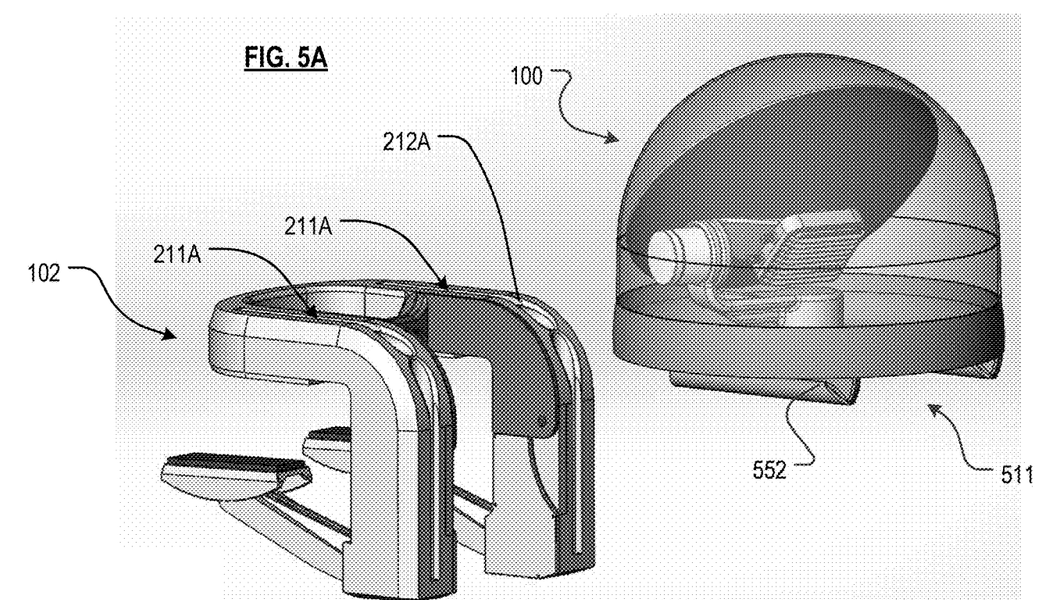
FIG. 5A depicts installation of the user terminal wherein the clamp is clamping in a horizontal orientation, such as when mounting to a roof eave.

FIG. 5A depicts user-terminal clamp 102 and user terminal 100 in preparation for coupling in a horizontal orientation (see FIG. 1A). Ribs 511 on the bottom of user terminal 100 couple to slots 211A in user-terminal clamp 102. In the illustrative embodiment, each rib 511 comprises a piece of material (e.g., metal, etc.) folded into a v-shape, wherein only one of the two major edges (the "inside" edge) of rib 511 attaches to or is formed as part of the bottom of the user terminal. The other major edge 552 does not attach to the bottom of the user terminal and is positioned under lip 212A as it is slid into slot 211A.

Figure 5B:
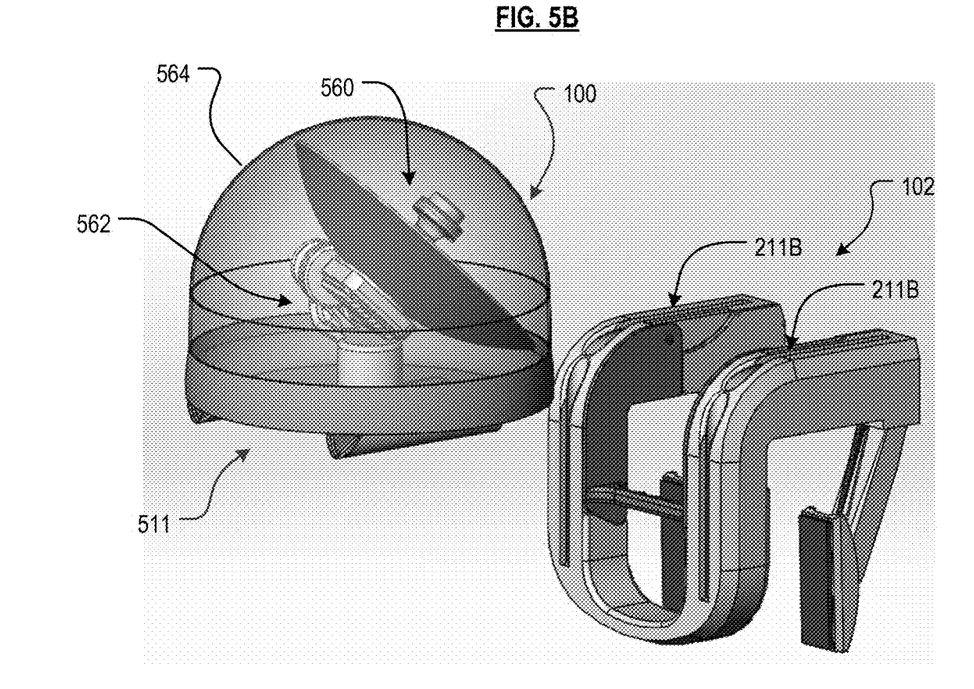
FIG. 5B depicts installation of the user terminal wherein the clamp is clamping in a vertical orientation, such as when mounting to a parapet.

FIG. 5B depicts user-terminal clamp 102 and user terminal 100 in preparation for coupling in a vertical orientation (see FIG. 1B). Ribs 511 on the bottom of user terminal 100 couple to slots 211B in user-terminal clamp 102 in the same fashion as discussed above in conjunction with FIG. 5A.

It is to be understood that the disclosure describes a few embodiments and that many variations of the invention can easily be devised by those skilled in the art after reading this disclosure and that the scope of the present invention is to be determined by the following claims.

What is claimed is:

1. A clamp, wherein the clamp is intended for use with a user terminal, and wherein, in use, the clamp couples the user terminal to a structure, the clamp comprising:
   a frame, the frame having two first and second support members that are disposed in parallel, spaced-apart relation to one another, each support member having two segments that are disposed orthogonally to one another, and wherein each segment includes a coupler, and wherein each segment in the first support member is parallel to a respective segment in the second support member, thus forming two groups of two parallel segments and further wherein, in use, either of the two groups couple the frame to the user terminal;
   two clamping members rotatably coupled to the frame;
   a handle rotatably coupled to the frame; and
   an actuation mechanism operatively coupled to the clamping members and the handle, wherein partial rotation of the handle results in upward movement of the clamping members.

2. The claim of claim 1 wherein the actuation mechanism includes:
   (a) a cable;
   (b) a cable ramp that is operatively coupled to the handle, wherein a first end of the cable is attached to the cable ramp; and
   (c) a cable tensioner that, in conjunction with movement of the cable ramp, is operative to impart tension to the cable.

3. The clamp of claim 2 wherein the cable tensioner and the cable are arranged so that the cable tensioner is placed in tension to impart tension to the cable.

4. The clamp of claim 2 wherein the cable tensioner and the cable are arranged so that the cable tensioner is placed in compression to impart tension to the cable.

5. The clamp of claim 2 wherein the cable ramp comprises a curved lobe.

6. The clamp of claim 2 wherein a second end of the cable is attached to the cable tensioner.

7. The clamp of claim 6 wherein the actuation mechanism further comprises a pulley, wherein the pulley contacts the cable between the first end thereof and the second end thereof, redirecting the cable so that movement of the cable ramp causes the clamping members to rise.

8. The clamp of claim 1 wherein the coupler comprises a slot.

9. The clamp of claim 1 wherein the actuation mechanism is arranged so that partial rotation of the handle results in upward movement of the clamping members until the clamping members contact a structure.

10. The clamp of claim 9 wherein the actuation mechanism is arranged so that after clamping members contact a structure, additional partial rotation of the handle results in an increasing clamping force against the structure.

11. A clamp, wherein the clamp is intended for use with a user terminal, and wherein, in use, the clamp couples the user terminal to a structure, the clamp comprising:
    a frame, the frame having first and second support members that are disposed in parallel, spaced-apart relation to one another, each support member having two segments that are disposed orthogonally to one another, and wherein each segment in the first support member is parallel to a respective segment in the second support member, thus forming two groups of two parallel segments, each of the segments in each group having a slot, and further wherein, in use, the slot in the segments in either group receive ribs disposed on a bottom of the user terminal, thereby coupling the frame to the user terminal;
    two clamping members rotatably coupled to the frame, one clamping member to one of the support members;
    a handle rotatably coupled to the frame; and
    an actuation mechanism operatively coupled to the clamping members and the handle, wherein partial rotation of the handle results in upward movement of the clamping members.

12. The clamp of claim 11 wherein the frame comprises a bridging portion, which, in conjunction with the one segment of each support member that is proximal to the bridging portion, is arranged in a u-shape configuration.

13. The clamp of claim 11 wherein the actuation mechanism comprises two instances of:
a cable;
a cable ramp that is operatively coupled to the handle, wherein a first end of the cable is attached to the cable ramp; and
a cable tensioner, wherein the cable tensioner is disposed in line with the cable, and further wherein the cable tensioner, in conjunction with movement of the cable ramp, is operative to impart tension to the cable, and wherein:
one of the two instances of the actuation mechanism is disposed in a first one of the support members and the rotatably coupled clamping member and the second of the two instances is disposed in a second one of the support member and respective rotatably coupled clamping member.

14. A clamp, wherein the clamp is intended for use with a user terminal, and wherein, in use, the clamp couples the user terminal to a structure, the clamp comprising:
a frame, the frame having first and second support members that are disposed in parallel, spaced-apart relation to one another, each support member having two segments that are disposed orthogonally to one another, and wherein each segment in the first support member is parallel to a respective segment in the second support member, thus forming two groups of two parallel segments, and further wherein, in use, either of the two groups engage the frame to the user terminal;
two clamping members rotatably coupled to the frame, one clamping member to one of the support members;
a handle rotatably coupled to the frame; and
an actuation mechanism operatively coupled to the clamping members and the handle, wherein partial rotation of the handle results in upward movement of the clamping members.

* * * * *